2,955,936
ALUMINOTHERMAL PROCESS FOR PREPARING CALCIUM-ALUMINUM ALLOY

Alden J. Deyrup, West Goshen Township, Chester County, Pa., assignor to E. I. du Pont de Nemours and Company, Wilmington, Del., a corporation of Delaware No Drawing. Filed July 14, 1958, Ser. No. 748,120

4 Claims. (Cl. 75—135)

This invention relates to the production of calcium-aluminum alloy, and is more particularly concerned with an improved aluminothermal process for preparing calcium-aluminum alloy.

It is known that calcium can be produced by an aluminothermal reduction of solid calcium oxide with molten aluminum according to the following reaction:

$$4CaO + 2Al \rightleftharpoons 3Ca + CaO \cdot Al_2O_3$$

The calcium dissolves in the aluminum and calcium-aluminum alloy can be obtained by simply cooling the melt. However, the rate of reaction and equilibrium are unfavorable. Thus Kirsebam, U.S. Patent No. 1,935,245 of November 14, 1933, discloses that a calcium-aluminum alloy containing only about 10% calcium was obtained after several hours of heating at 1000–1200° C. Such a heating schedule is impractical for commercial operation. Heat input through reactor walls at these high temperatures is expensive. Usable materials of construction are few, and life of equipment short. Furthermore, about 50% of the metals formed an infusible dross with the calcium aluminate produced in the reduction and could not be recovered as calcium-aluminum alloy.

It has been proposed to overcome the latter difficulty by operating at a temperature above the melting point of the calcium aluminate slag so that the fused slag and the molten calcium-containing aluminum phases can be separated more readily. However, the melting point of the slag is well above the boiling point of calcium (1170° C.) and close to the vaporizing temperature of aluminum (about 1600° C.), which introduces serious difficulties. Such a high temperature is undesirable in any event, as it greatly increases the expense of the process.

The reaction can be made more favorable by operating under a high vacuum, so that the calcium is vaporized from the system as it is formed. The calcium vapor can then be condensed and melted with aluminum in any desired proportions to form calcium-aluminum alloy. However, this involves serious practical and economic disadvantages in operation under vacuum at high temperature, recovery of calcium from vapor, and the additional step of remelting to form the desired alloy.

An object of this invention is to provide an improved aluminothermal process for producing calcium-aluminum alloy directly from calcium oxide at lower temperatures and more rapidly than has been possible previously. Another object is to provide such a process which is suitable for producing calcium-aluminum alloy containing more than 15% calcium. Other objects will become apparent from the specification and claims.

In accordance with this invention, calcium-aluminum alloy is produced by an aluminothermal process in which calcium oxide is reduced with aluminum in a melt containing at least 3 parts by weight of calcium chloride per part of aluminum. The calcium chloride, when present in at least this amount, unexpectedly causes the reaction to proceed rapidly at much lower temperatures than were previously possible, so that temperatures of 640° to 1150° C. can be used with heating times of less than 1 hour and usually 20 minutes or less. In addition, it is surprising to find that operation under these conditions makes possible the production of calcium-aluminum alloy containing more than 15% calcium.

Preferably, the calcium oxide is reacted with an aluminum-calcium chloride melt at 640° to 900° C. so that the calcium-aluminum alloy can separate as a solid phase as it is formed. Within this temperature range best results have been secured at the lower end of the range. This is suprising because the reaction:

$$4CaO + 2Al \rightarrow CaO \cdot Al_2O_3 + 3Ca$$

is endothermal by about 58,000 calories, and hence it would be expected to be more favorable at higher temperatures. However, I suspect that, in the presence of calcium chloride to promote the reaction, there must be solid phases formed within the reaction system which favor the desired higher calcium content of the alloy at these lower temperatures. These may be calcium-aluminum intermetallic compounds. The proportion of calcium oxide to aluminum can be varied over a wide range, such as 1 to 7 parts by weight of calcium oxide to 1 part aluminum. The optimum proportions for the production of alloy containing about 20% or more of calcium are 2 to 3 parts by weight of calcium oxide per part of aluminum.

The amount of calcium chloride should be at least 3 parts by weight per part of aluminum, since there is an unexplained rapid decrease in the calcium content of the alloys when the proportion of calcium chloride is reduced below 3 under otherwise comparable conditions. There is no advantage in using a large amount of calcium chloride and the preferred proportions are 3 to 6 parts per part of aluminum. When operating at temperatures below 750° C. one or more alkali halide and/or alkaline earth halide should be used in addition to the calcium chloride to lower the melting point. Thus, a mixture of sodium chloride and calcium fluoride can be used in an amount about equal to that of the aluminum to provide a fluid melt at 640°–750° C. Oxygen should be excluded from the melt. An inert atmosphere such as nitrogen or argon can be used, or the melt can be blanketed with carbon in an outer container to form a $N_2$—CO atmosphere by reaction with air.

Since only moderate temperatures are required, the conventional furnaces used for melting aluminum are satisfactory. There is no alloying of aluminum with iron, probably because the calcium-aluminum alloy forms as granules which rapidly become coated with a refractory calcium aluminate shell under the reaction conditions. However, the alloy may contain traces of iron when produced in contact with an iron lining. If this is objectionable other furnace linings can be used. The calcium-aluminum alloy is readily separated from the calcium chloride and excess calcium oxide by washing the cooled melt with water. This disperses the calcium oxide and dissolves the calcium chloride. The latter can be recovered for re-use by filtration and evaporation. The separated alloy is in the form of spherical metallic granules, usually coated with a white or yellow shell. This shell may be largely calcium aluminate, but may vary in reactivity for reasons unknown. It can be removed by washing with hot water, by a short acid pickle, or by mechanical means. Some of the larger granules may also contain pockets of calcium chloride. These granules can be crushed and washed to remove impurities.

The following examples, in which parts are by weight unless otherwise indicated, illustrate preferred embodiments of the invention:

*Example 1*

A mixture of 1.0 part granular aluminum, 2.5 parts calcium oxide and 3.3 parts calcium chloride is heated in a furnace at 1040° C. An inert atmosphere is provided by blanketing the mixture with carbon to form a $N_2$—CO atmosphere by reaction with air. The aluminum and calcium chloride form a fused melt mixture which reacts with the calcium oxide to form solid calcium-aluminum alloy and solid calcium aluminate. The reaction is substantially completed after 20 minutes of heating. The products are then cooled and worked up by leaching with running hot water. This disperses excess calcium oxide and dissolves away the calcium chloride, leaving spherical metallic granules which are usually coated with a white or yellow shell. This shell, which may be largely calcium aluminate, can be removed by continuing the hot water treatment or by mechanical action, but is most readily removed by a short acid pickle. Any of the larger granules which may contain calcium chloride in pockets are crushed so that the salt can be dissolved. There is thus obtained about 1.1 parts of calcium-aluminum alloy product containing 18.5% by weight of calcium.

This example illustrates that calcium chloride catalyzes the aluminothermal reaction, so that a much shorter time is required than was previously needed to complete the reaction at comparable temperatures. It also illustrates that calcium-aluminum alloy having a much higher calcium content can be obtained when calcium chloride is used. The following examples illustrate that considerably lower temperatures than have previously been required not only give satisfactory results but provide a further increase of calcium content in the alloy:

*Example 2*

Example 1 is repeated except that the mixture of aluminum, calcium oxide and calcium chloride is heated at 900° C. for 20 minutes. A calcium-aluminum alloy product is obtained which contains 19.1% by weight of calcium.

*Example 3*

Example 1 is repeated except that the mixture is heated to 750° C. and the heating is then discontinued so that the temperature falls slowly. A calcium-aluminum alloy product is obtained which contains 20.7% by weight of calcium.

*Example 4*

Example 3 is repeated with the mixture heated in an inert atmosphere of argon instead of blanketing the mixture with carbon. This change does not affect the product obtained.

*Example 5*

A mixture of 1.0 part granular aluminum, 2.6 parts calcium oxide, 4.6 parts calcium chloride and, to lower the melting point, 0.6 part sodium chloride and 0.4 part calcium fluoride, is heated in an atmosphere of argon in a furnace. The temperature is raised to 680° C. and then allowed to fall to 640° C. The products are worked up as in Example 1. A calcium-aluminum alloy is obtained which contains 25.1% by weight of calcium.

The utility of calcium-aluminum alloys as reducing agents for metallurgical purposes has long been recognized. For example, such uses are discussed by Goldschmidt in U.S. Patent No. 875,345, dated December 31, 1907, from which advantages of the combined action of calcium and aluminum, especially as an alloy containing a substantial proportion of calcium, are apparent. However, when prepared by previous processes these alloys have been too expensive for extensive use. The new low-cost process of the present invention for producing calcium-aluminum alloys, including alloy containing more than 15% calcium, is an outstanding contribution.

Since many different embodiments of the invention may be made without departing from the spirit and scope thereof, it is to be understood that the invention is not limited by the specific illustrations except to the extent defined in the following claims.

I claim:

1. In an aluminothermal process of heating reactants consisting essentially of calcium oxide and aluminum for preparing calcium-aluminum alloy by reducing calcium oxide with aluminum in a melt, the improvement which comprises reducing the calcium oxide in a melt of aluminum and at least 3 parts by weight of calcium chloride per part of aluminum at a temperature of 640° to 1150° C.

2. The aluminothermal process of heating reactants consisting essentially of calcium oxide and aluminum for preparing calcium-aluminum alloy which comprises heating in an inert atmosphere 1 to 7 parts by weight of calcium oxide with 1 part aluminum in the presence of 3 to 6 parts calcium chloride at a temperature of 640° to 1150° C. in a melt to form calcium-aluminum alloy, and separating the alloy from the reaction mixture.

3. The aluminothermal process of heating reactants consisting essentially of calcium oxide and aluminum for preparing calcium-aluminum alloy which comprises heating a mixture of 1 part by weight aluminum, 2 to 3 parts by weight calcium oxide and 3 to 6 parts by weight calcium chloride at 680° to 900° C. in an inert atmosphere to form a melt, maintaining the melt at 640° to 900° C. while the calcium oxide reacts with the aluminum to form solid calcium-aluminum alloy, the reaction being substantially complete in less than 1 hour, cooling the melt, and washing the calcium-aluminum alloy to remove calcium chloride, excess calcium oxide and calcium aluminate.

4. In an aluminothermal process for preparing calcium-aluminum alloy by heating reactants consisting essentially of calcium oxide and aluminum to reduce calcium oxide with aluminum in a melt, the improvement which comprises reducing the calcium oxide at a temperature of 640 to 750° C. in a melt of aluminum, at least 3 parts by weight of calcium chloride per part of aluminum, and at least one additional salt to provide a fluid melt selected from the group consisting of alkali halides and alkaline earth halides.

References Cited in the file of this patent

UNITED STATES PATENTS

| | | |
|---|---|---|
| 451,404 | Langley | Apr. 28, 1891 |
| 2,099,151 | Vogt | Nov. 16, 1937 |
| 2,240,584 | Suchy et al. | May 6, 1941 |
| 2,282,241 | Peake | May 5, 1942 |